United States Patent [19]
Gruber et al.

[11] Patent Number: 5,675,578
[45] Date of Patent: Oct. 7, 1997

[54] METHOD OF TRACING THE ROUTE OF VIRTUAL CONNECTIONS

[75] Inventors: John Gerald Gruber, Orleans, Canada; Asghar Ebrahim Methiwalla, Addison, Tex.; Richard Vickers, Kanata, Canada

[73] Assignee: Bell-Northern Research Ltd., Ottawa, Canada

[21] Appl. No.: 419,898

[22] Filed: Apr. 11, 1995

[51] Int. Cl.$^6$ .................. H04J 3/12; H04L 12/56
[52] U.S. Cl. .................. 370/248; 370/249; 370/397; 370/410
[58] Field of Search .................. 370/14, 15, 13, 370/13.1, 16, 17, 54, 60, 60.1, 94.1, 20.1, 20.2, 20.4, 20.5, 68.2, 241, 242, 243, 244, 245, 246, 247, 248, 249, 252, 351, 389, 392, 395, 396, 397, 400, 409, 428, 522, 410

[56] References Cited

U.S. PATENT DOCUMENTS

| | | | |
|---|---|---|---|
| 5,056,085 | 10/1991 | Vu | 370/60 |
| 5,337,307 | 8/1994 | Sato et al. | 370/60 |
| 5,384,768 | 1/1995 | Fujii | 370/14 |
| 5,408,461 | 4/1995 | Uriu et al. | 370/14 |
| 5,440,565 | 8/1995 | Miyamoto et al. | 370/14 |

OTHER PUBLICATIONS

The ATM Forum, "ATM User–Network Interface Specification", pp. 63–68.

*Primary Examiner*—Wellington Chin
*Assistant Examiner*—Huy D. Vu
*Attorney, Agent, or Firm*—Foley & Lardner

[57] ABSTRACT

A telecommunications network such as an ATM, Frame Relay or packet based network will be better managed by identifying nodes through which a virtual connection is routed between two end nodes. A new method of tracing the nodes on the route includes sending trace cells downstream of a monitoring node toward one or both end nodes. Each downstream node either loops back a trace cell identifying itself to the monitoring node or forwards the trace cell further. A plurality of trace cells sent along the route identify nodes located thereon. In one embodiment, the trace cell is an extension of the ATM FMOAM cell (ATM Fault Management OAM cell) specified for loopback functions.

8 Claims, 9 Drawing Sheets

METHOD OF TRACING THE ROUTE OF VIRTUAL CONNECTIONS

FIELD OF THE INVENTION

The present invention relates generally to monitoring operation and maintenance of a telecommunication network, such as ATM, Frame Relay or packet based networks. In particular, it is directed to tracing the route of a virtual connection between two nodes of a network, using trace cells, test cells or specially defined OAM (Operations, Administration, and Maintenance) fault management cells.

BACKGROUND OF THE INVENTION

Telecommunication networks must be properly maintained to ensure that adequate network performance is achieved and that end-user services are supported. Maintenance functions include "performance management" (continuous in-service performance monitoring for proactive warning of performance degradation), "fault management" (detection and location of network trouble and failure), and configuration management (provisioning). In performing these functions, especially configuration management, it is important to be able to trace the route of a virtual connection which exists between two nodes through a network. The route is made up of a series of links, each link being formed by a pair of nodes or connection points. To trace a route, it is therefore necessary to determine the identities of such nodes through which a virtual connection is routed. These identities also enable the network links and segments in the connection to be identified. Depending on the identity level of detail, the network elements such as cross connects and switches in each node can also be identified.

Specifically, the tracing of the route is required for the following reasons:

- to generate a record of the connection route in terms of the identities of the nodes and network elements in the route;
- to verify that the trace record matches the provisioning database record of the connection, and to update the database if desired, e.g., after a route reconfiguration; and
- to fault locate a misroute, i.e., determine the network element, node and link where a misroute has occurred.

OBJECTS OF THE INVENTION

It is therefore an object of the invention to provide a method of identifying nodes in a network through which a connection is routed.

It is another object of the invention to provide a method of tracing nodes in a network by using a trace cell.

It is a further object of the invention to provide a method of managing a network by tracing nodes through which a connection is routed.

SUMMARY OF THE INVENTION

Briefly stated the invention is in the area of management of a network which is holding a virtual connection between two end nodes by a route consisting of one or more links. The invention is directed to a method of identifying a node forming one end of a link of the route. The method comprises a step of a monitoring node on the route sending a trace cell downstream towards one or both end nodes, the trace cell having a link count field set to a predetermined count and carrying the identification of the monitoring node. The method further includes steps of nodes downstream on the route successively decrementing the link count field and forwarding the trace cell downstream, and a loopback node downstream on the route receiving the trace cell and sending to the monitoring node a loopback trace cell carrying the identification of said loopback node, if the decremented link count field equals 0.

According to another aspect, the invention is directed to a method of identifying nodes forming the links of the route comprising a step of a monitoring node on the route sending a trace cell downstream towards one or both end nodes, the trace cell having a link count field set to a predetermined count and carrying the identification of the monitoring node. The method further includes steps of each of the successive nodes downstream on the route receiving the trace cell, decrementing the link count field, forwarding downstream the trace cell having the decremented link count field, and sending to the monitoring node a loopback trace cell carrying the identification of each said node. The method also includes a step of a loopback node downstream on the route sending to the monitoring node a loopback trace cell carrying the identification of said loopback node if the decremented link count field equals 0.

According to yet a further aspect, the invention is directed to a method of identifying nodes forming the links of the route comprising steps of a monitoring node on the route sending a plurality of trace cells downstream towards one or both end nodes, each trace cell having a link count field set to each of a plurality of predetermined counts and carrying the identification of the monitoring node. The method further includes steps of nodes downstream on the route decrementing the link count field and forwarding the trace cell downstream if the decremented link count field is larger than 0. The method finally has a step of each of the nodes downstream on the route receiving the trace cell and sending to the monitoring node a loopback trace cell carrying the identification of each said node if the decremented link count field equals 0.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE PREFERRED EMBODIMENTS OF THE INVENTION

An ATM virtual connection is created between two nodes through the use of VPI/VCI (virtual path identifier/virtual channel identifier). Each ATM cell carries a VPI/VCI field in its header. Thus, referring to FIG. 1, an ATM virtual connection between two end points is shown by 10 in an ATM network 12. The connection is made up of one or more ATM links and ATM segments (a link being between two adjacent ATM nodes and a segment containing more than one link). As discussed earlier, it is important for network management purposes to be able to trace an ATM virtual connection (route) by identifying ATM nodes through which the connection is held.

Figure 1:
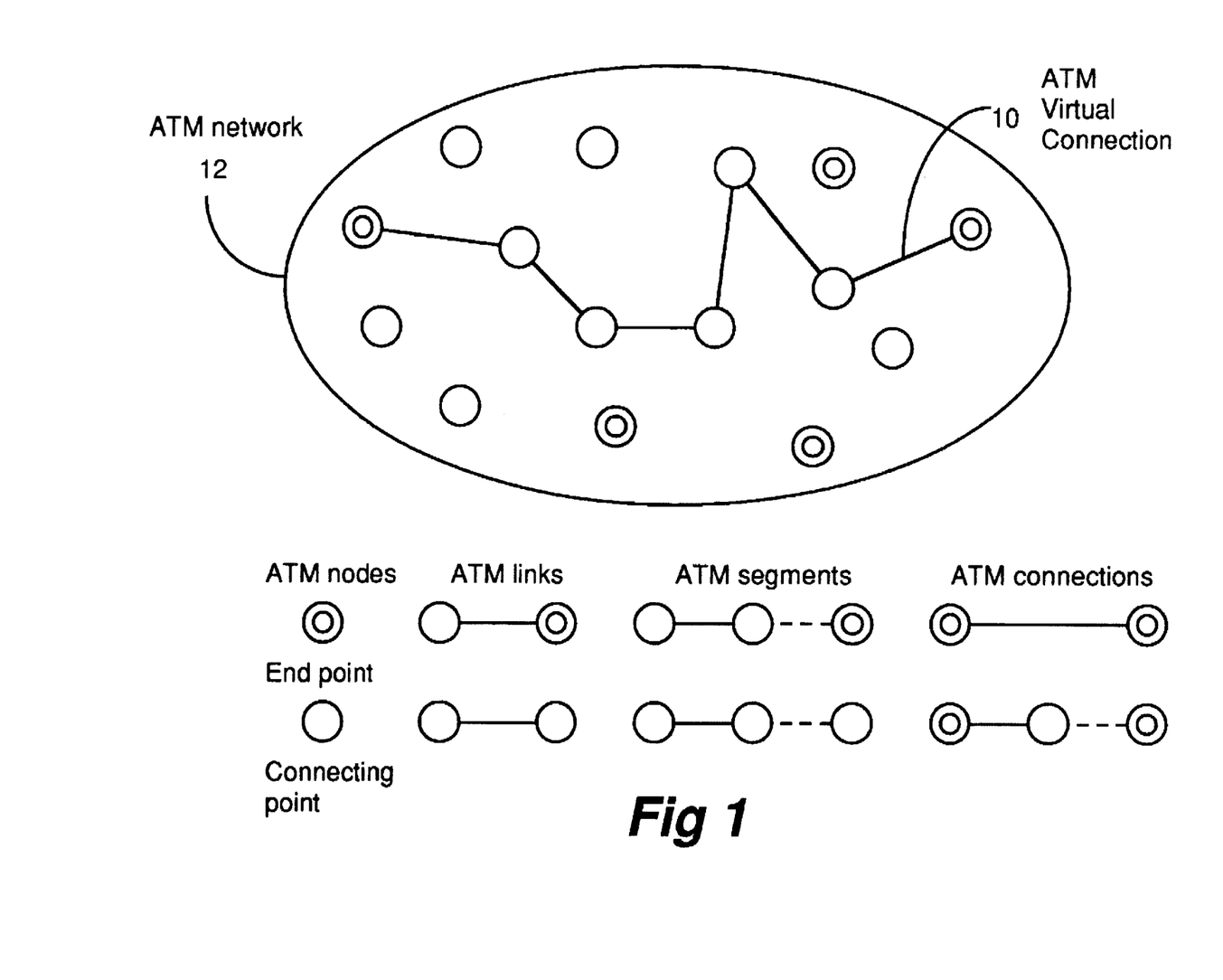
FIG. 1 is sketch showing an ATM virtual connection through an ATM network.

It should be noted that while the above description and FIG. 1 deal with an ATM network, the invention is equally applicable to any telecommunications network such as Frame Relay or packet based networks which hold virtual connections among nodes. The description and figures which will follow only discuss ATM embodiments for illustration purposes but it should be understood that all the embodiments can be realized in other telecommunications networks.

Figure 2:
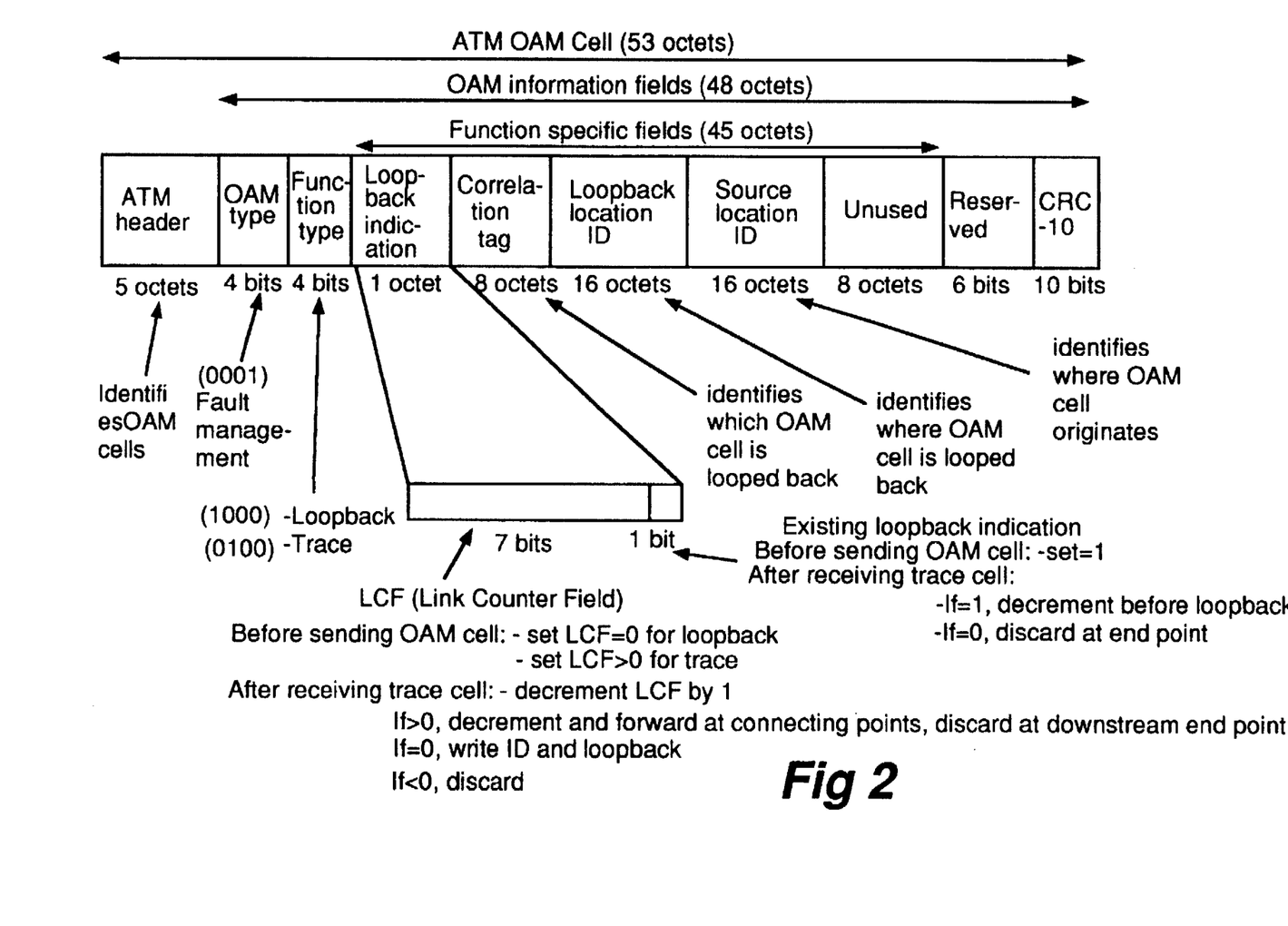
FIG. 2 is a cell structure of the ATM FMOAM cell embodying the present invention.

For this purpose, a special function cell is created which carries protocol fields to indicate the trace function, link count and the identification of a node where the trace cell is looped back, and of course the identification of a node which initiated the trace function. While a new trace cell can be designed, ITU-T, T1 and the ATM Forum currently specify the ATM fault management OAM cell (FMOAM cell), for the loopback function. This FMOAM cell can be extended to perform the trace function. FIG. 2 shows the structure of an FMOAM cell. In the figure, OAM type field is (0001) for fault management and function type for loopback is (1000). The correlation tag identifies which OAM cells are looped back. The loopback location and source location identify respectively a node at which the OAM cell is looped back and the node which originated the OAM cell The figure also shows the loopback indication field. For the loopback function, seven bits of this field are set to 0 and the last bit is set to 1. The present invention is based on an extension of this loopback indication field. The figure therefore includes a cell structure which deals with loopback as well as trace functions. As seen in the figure, according to one embodiment, the loopback and trace functions are distinguished by two corresponding codes in the function type field, that is to say, (1000) for loopback and (0100) for the trace function. As with loopback, the trace procedure can be administered from a single node on the route, and in a manual or automated manner. Referring further to FIG. 2, the loopback identification field is one octet long, of which seven bits are set to 0 and the remaining bit to 1 for the loopback function. This is the field which is extended for the trace function. Seven bits of the octet form the Link Count Field (LCF) defined as follows:

before sending an OAM cell:

set LCF=0 for loopback as mentioned above;

set LCF>0 for trace function; the algorithm is as follows: after receiving trace cell, decrement LCF by 1 if LCF>0, forward at connecting points, discard at downstream end point;

if LCF=0, write ID and loopback;

if LCF<0, discard.

The remaining loopback indication bit (LBI bit) of the octet is used for trace in the same way as for loopback, that is to say:

if the bit is 1, it is decremented before the cell is looped back;

if the bit is 0, the cell is allowed to return to the monitoring point and is discarded at an end point.

Other fields such as correlation tag, loopback location, and source location are also the same as those defined for loopback. The correlation tag identifies which OAM cell is looped back. The loopback location ID and source location ID fields are to identify the ATM node at which an OAM cell is looped back and is originated respectively.

Figure 3:
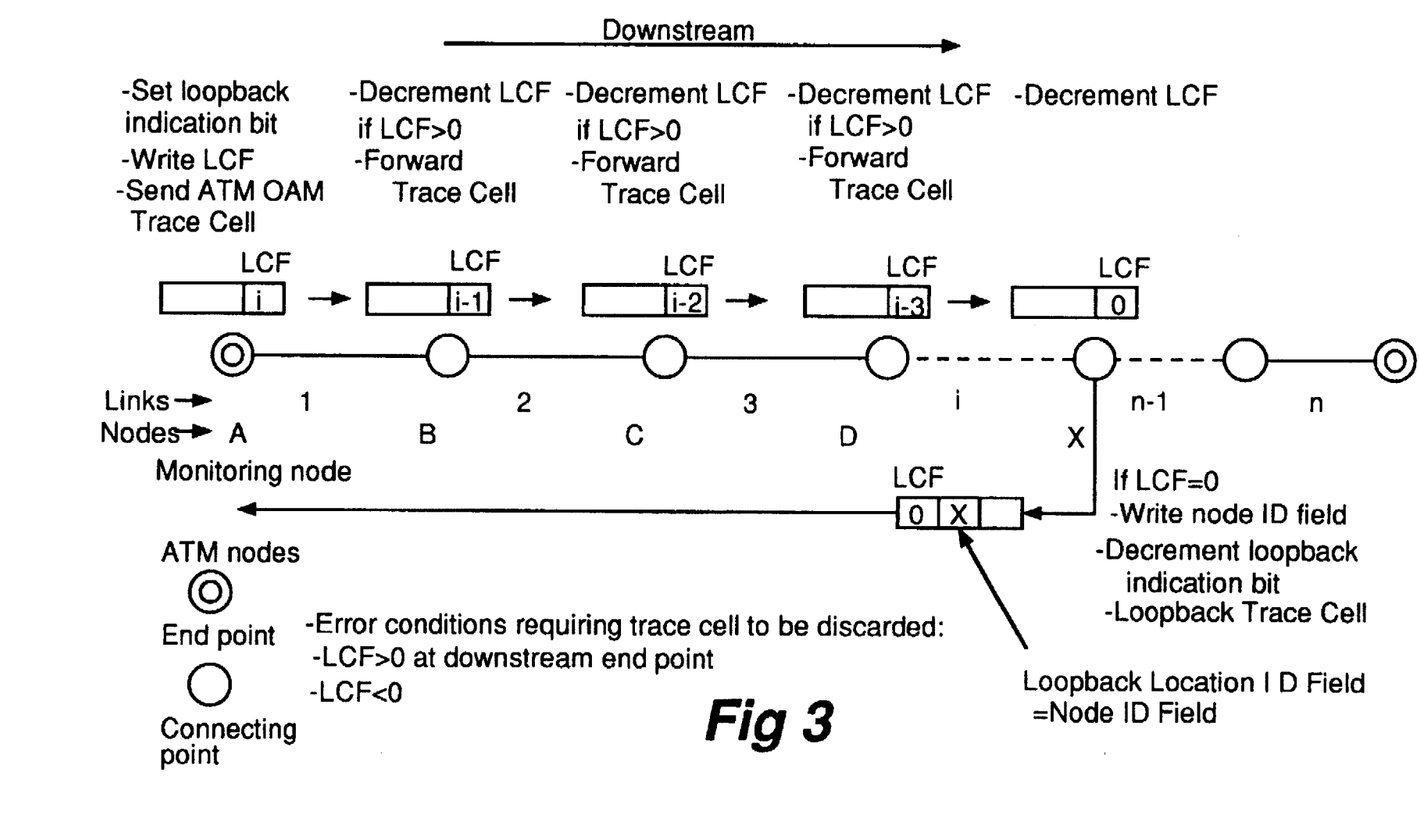
FIG. 3 is a schematic illustration of a method according to one embodiment of the invention.

Referring to FIG. 3, the tracing of ATM nodes in a virtual connection according to one embodiment of the invention is performed as follows:

1. To determine the identity of a node that is "i" links downstream from node A:

(a) Node A sends an ATM trace cell in the downstream direction. The ATM trace cell is created by setting the trace cell Link Count Field (LCF) to "i". (From this step, the identity of any individual node in a connection can be verified without verifying the identities of the other nodes.)

(b) Nodes downstream from node A decrement the LCF by 1 and check if decremented LCF=0.

if LCF=0, node X writes its identity into the trace cell loopback location ID field, decrements the LBI bit (Loopback Indication bit and loops back the trace cell;

if LCF>0, connecting points forward the trace cell in the downstream direction;

if decremented LCF<0, the trace cell is discarded;

if decremented LCF>0 at an end point, this is also an error condition, and the trace cell is discarded.

(c) Node A performs steps (a) and (b) for all links, successively setting LCF=1, 2, 3, . . . , n, thereby obtaining loopbacks and hence node identities from all nodes along the connection route.

(d) If a trace cell is not returned to node A after a suitable time-out, e.g. 5 seconds, the trace is inconclusive and node A can repeat the trace.

Figure 4:
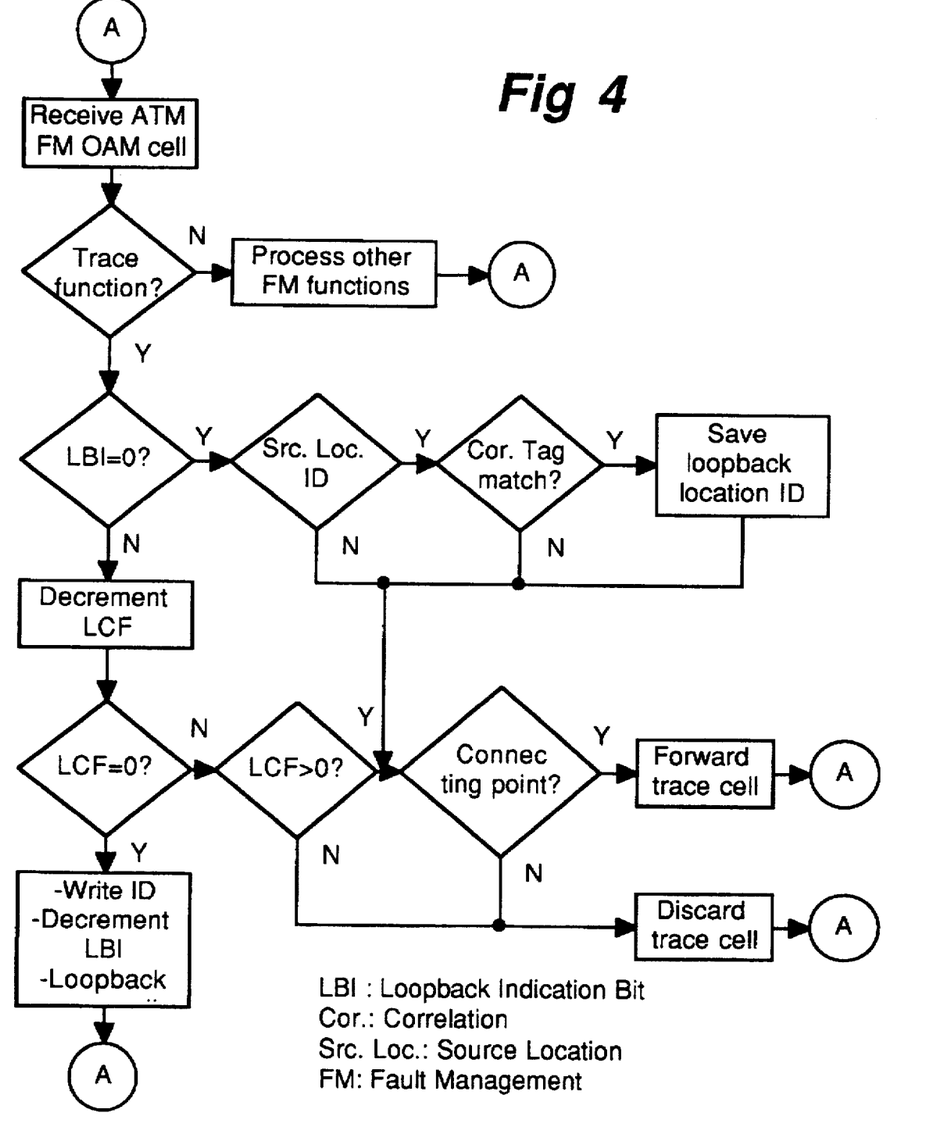
FIG. 4 is an algorithmic flow chart of the invention.

FIG. 4 is an algorithmic flow chart illustrating trace operation as well as relevant loopback operations needed to ensure correct trace operation. It should also be noted that in FIG. 3, node A is shown as an end point, that is to say, it is one of two end nodes of a virtual connection.

Figure 5:
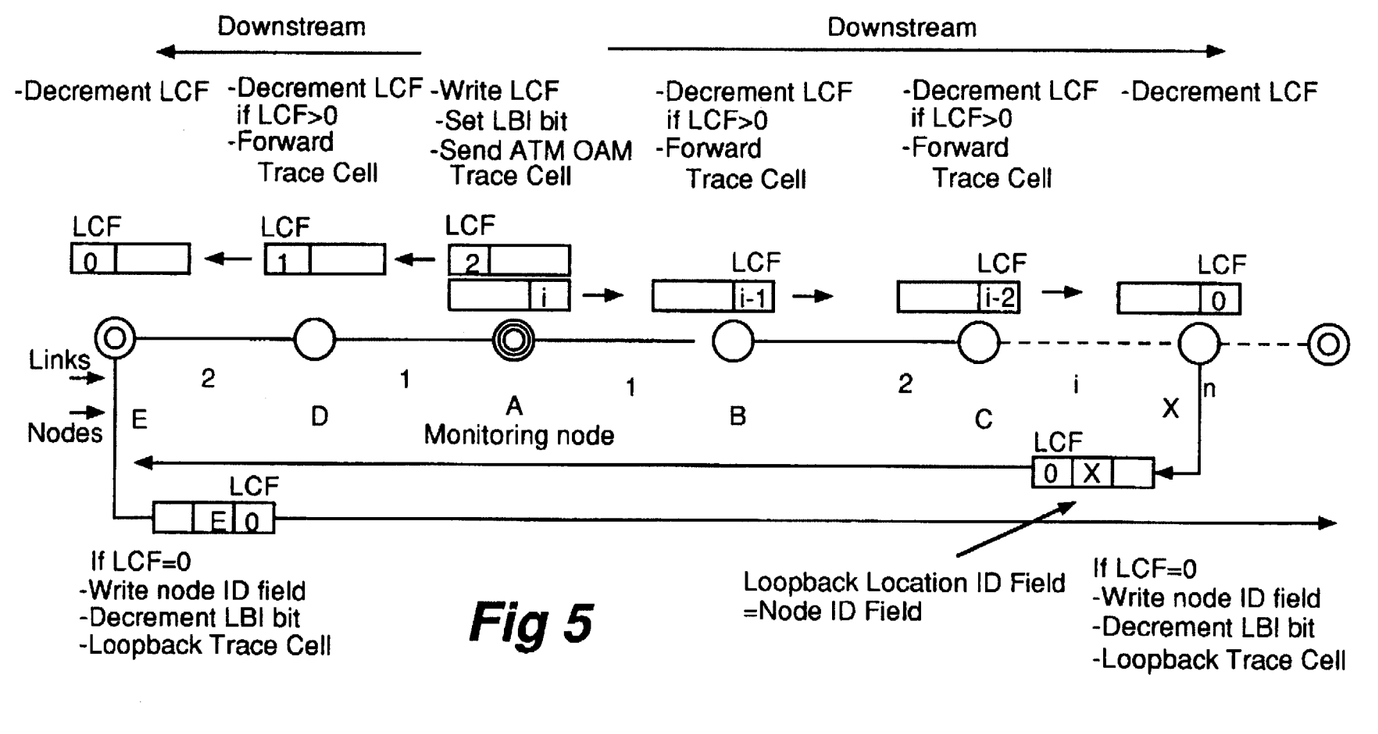
FIGS. 5–9 are schematic illustrations of further embodiments of the invention.

2. It is apparent, however, that node A is a node (monitoring node) from which the tracing is carried out and it does not have to be an end node. If the monitoring node is one of the connecting points of the virtual connection, a trace cell is sense to both end nodes in two different directions, as shown in FIG. 5. In the figure, node A is a monitoring node but is located between the two end nodes.

Figure 6:
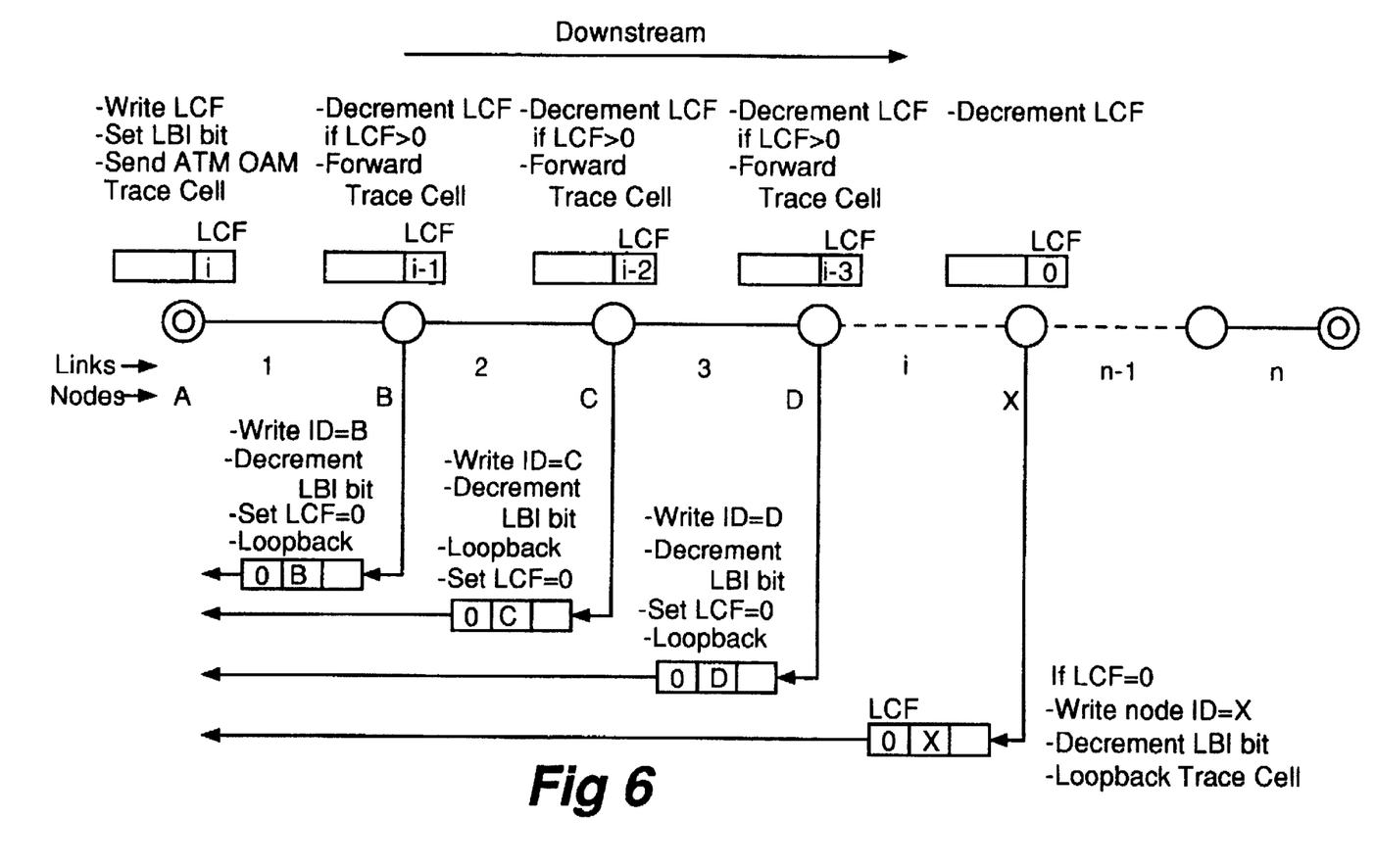

3. As in 1. above, to determine the identity of a node that is "i" links downstream from node A:

(e) Instead of nodes upstream of node X just forwarding the trace cell in the downstream direction when LCF>0 as in step (b) above, FIG. 6 shows another embodiment of the invention. In the figure, each of the nodes writes its identity into the trace cell loopback ID field and loops back the trace cell, after setting LCF=0 and decrementing the LBI bit for the looped back cell. Of course, each node also forwards the trace cell downstream after decrementing LCF by one for the forwarded cell. Thus only one trace cell with LCF=n needs to be sent downstream. This would speed up the trace procedure and reduce downstream trace cell traffic from n cells to 1 cell, but upstream (looped back) trace cell traffic would be more bursty.

Figure 7:
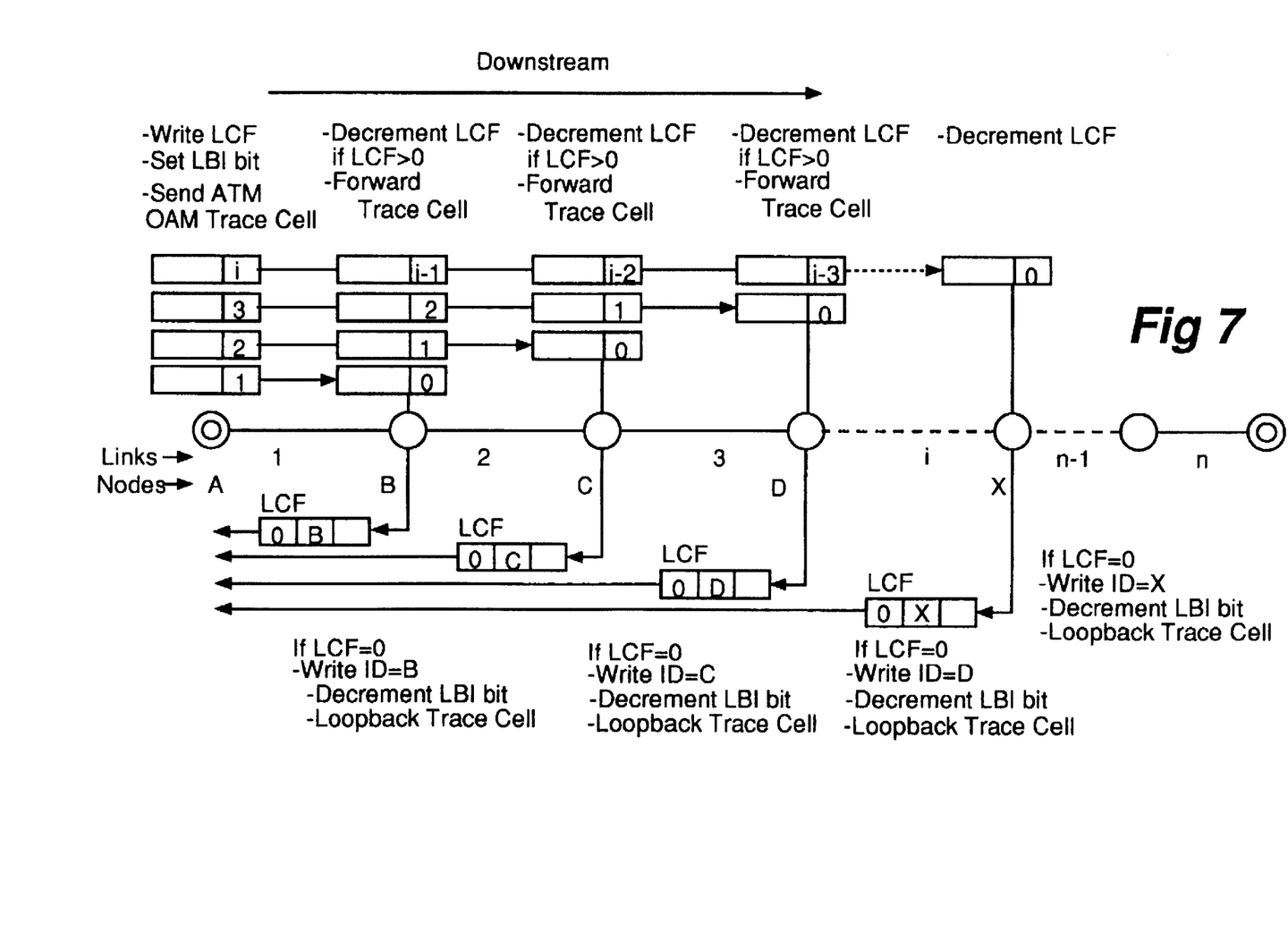

4. FIG. 7 depicts a further embodiment of the invention. In the figure, instead of tracing each node successively as in step (c) above, node A sends the n OAM cells (with LCF=1, 2, 3, . . . , n, respectively) more or less simultaneously, or independent of the trace result for each node. This will speed up the trace procedure, but both downstream and upstream trace cell traffic will be more bursty.

Figure 8:
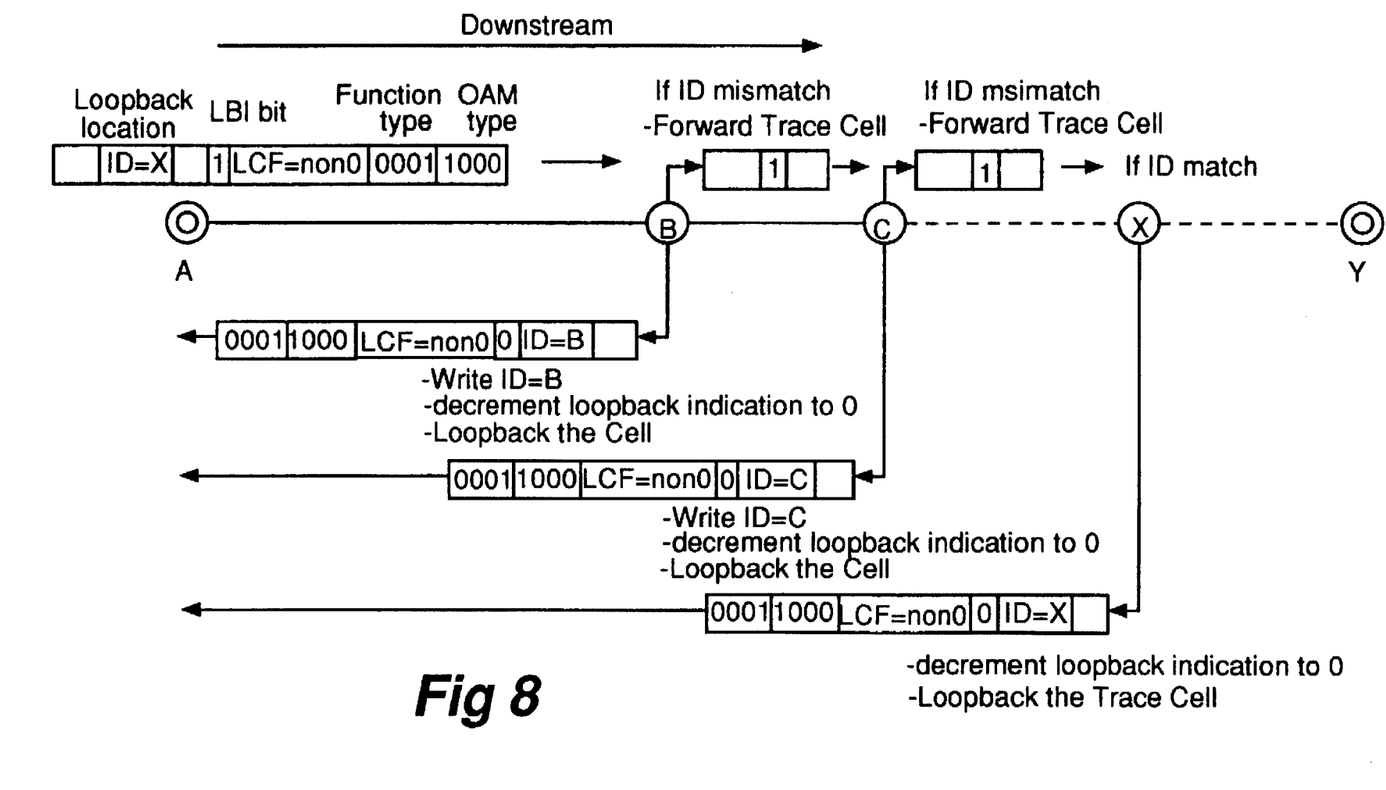

5. FIG. 8 shows yet another embodiment of the invention. This embodiment distinguishes loopback and trace functions by "0" and "non-0" content of the LCF, respectively. This embodiment uses the fact that OAM cell loopback operation requires a node to loopback a loopback cell with ID in the loopback point ID field that matches the node ID. In case of a mismatch between the ID field and the node ID, a fault management OAM cell with "non-0" LCF (i.e., a trace cell) signals the node to write its ID into the loopback point ID field (i.e., overwrite the incorrect ID), set the LBI bit to 0 and loop back the trace cell. At the same time, the trace cell is forwarded until the node with the correct ID is reached. At this node, the LBI bit is set to 0 and the trace cell is looped back. Since mismatches happen at most nodes, this embodiment is functionally similar to embodiment 3, above shown in connection with FIG. 6 and has the same implications regarding bursty upstream trace cell traffic. Another embodiment in FIG. 9 also distinguishes loopback and trace functions by the "0" and "non-0" content of the LCF, respectively. Since OAM cell loopback operation requires an end point to loopback a loopback cell having the default "all ones" ID in the loopback point ID field, end points can be traced with a simplified procedure as follows.

Figure 9:
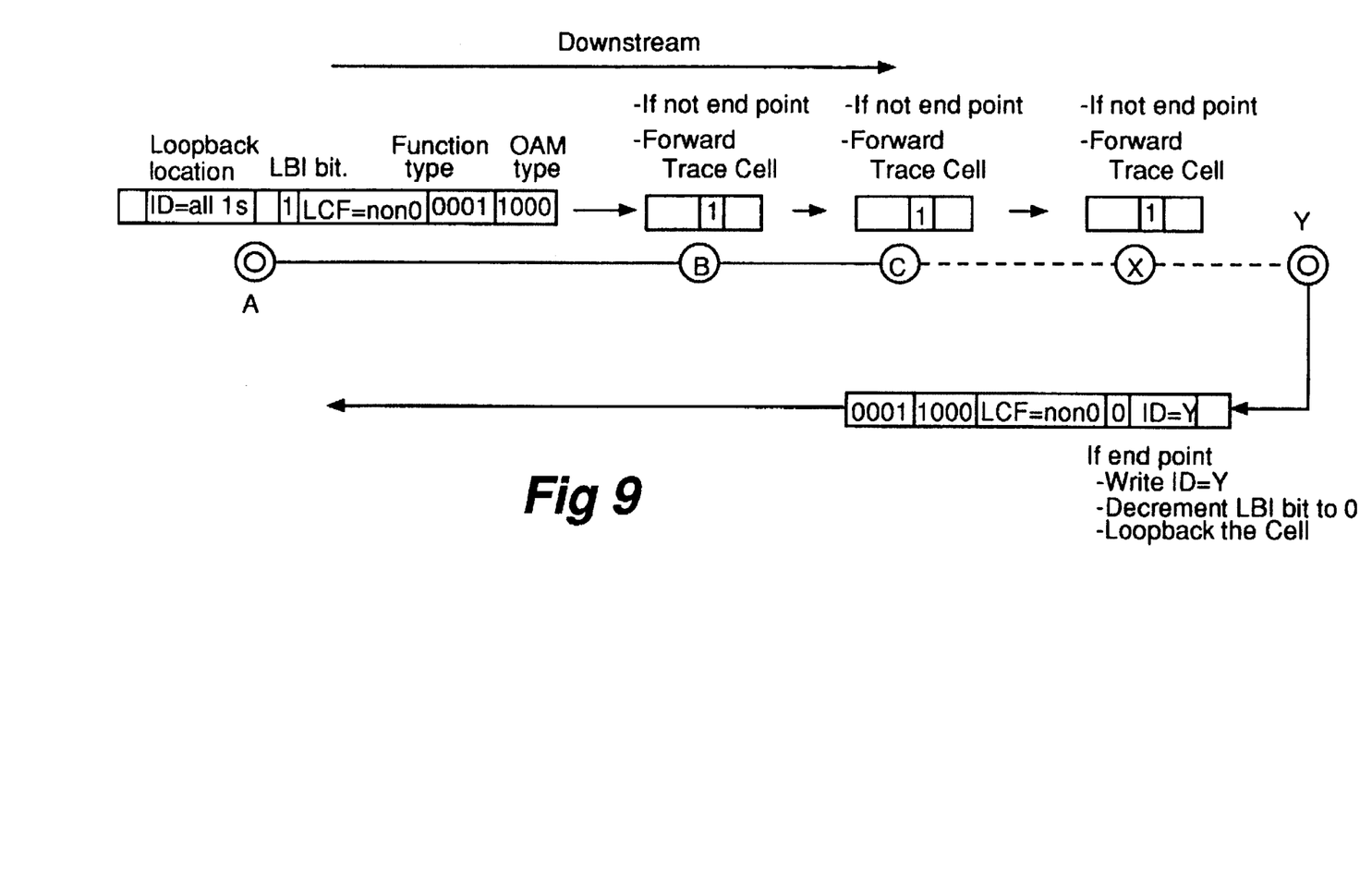

Receiving a fault management OAM cell with "non-0" LCF (i.e., a trace cell) at a connecting point, signals a connecting point to forward the trace cell. Receiving a trace cell at an end point signals an end point to decrement the LBI bit (as with loopback cells), write its ID into the loopback point ID field (i.e., overwrite the default "all ones" ID), and loop back the trace cell.

As with loopback cells, at connecting points these trace cells can either be: a) processed in real time, or b) copied and transited through connecting points in real time, with any necessary processing done in non-real time.

The processing shown in FIG. 2 applies to end points and to connecting points. However, at connecting points, there are two possibilities:

a) OAM trace cells are extracted and processed, and those not requiring loopback are returned to the stream essentially in real time. Any necessary loopbacks are then performed within 1 second.

b) OAM trace cells are copied. OAM trace cells also undergo minimal processing by having their LCFs decremented and then transiting through the node in essentially real time. The copied cells are then processed further and any necessary loopbacks performed within 1 second. The transited OAM trace cells are discarded by the end point which detects LCF<0 (OAM trace cells may be discarded by any downstream connecting point which detects LCF<0). This approach is most useful for loopback where often no connecting point processing other than forwarding is needed. This approach is not reflected in FIG. 2 for the trace function, since some processing (decrementing LCF) is always needed.

What is claimed is:

1. In a telecommunications network which is holding a virtual connection between two end nodes by a route consisting of one or more links, a method of identifying a node forming an end of a link of the route comprising steps of:

a monitoring node on the route sending a trace cell downstream towards one or both end nodes, the trace cell having a link count field set to a predetermined count and carrying the identification of the monitoring node;

nodes downstream on the route successively decrementing the link count field and forwarding the trace cell downstream; and a loopback node downstream on the route sending to the monitoring node a loopback trace cell carrying the identification of said loopback node, if the decremented link count field equals 0.

2. The method according to claim 1 further comprising steps of the monitoring node sending a plurality of trace cells downstream towards one or both end nodes, each trace cell having a link count field set to one of a plurality of predetermined counts.

3. The method according to claim 2, wherein the trace cell is an ATM FMOAM cell whose loopback indication field is extended as the link count field.

4. The method according to claim 3, wherein the loopback node is one of the end nodes and the loopback location ID field of the ATM FMOAM is set to indicate the end node.

5. In a telecommunications network which is holding a virtual connection between two end nodes by a route consisting of one or more links, a method of identifying nodes forming the links of the route comprising steps of:

a monitoring node on the route sending a trace cell downstream towards one or both end nodes, the trace cell having a link count field set to a predetermined count and carrying the identification of the monitoring node;

each of the successive nodes downstream on the route decrementing the link count field, forwarding downstream the trace cell having the decremented link count field, and setting the link count field to 0 and sending to the monitoring node a loopback trace cell carrying the identification of said each node; and a loopback node downstream on the route sending to the monitoring node a loopback trace cell carrying the identification of said loopback node, if the decremented link count field equals 0.

6. The method according to claim 5, wherein the trace cell is an ATM FMOAM cell whose loopback indication field is extended as the link count field and whose loopback location ID field is set to indicate the end nodes.

7. In a telecommunicatios network which is holding a virtual connection between two end nodes by a route consisting of one or more links, a method of identifying a node forming an end of a link of the route comprising steps of:

a monitoring node on the route sending a trace cell downstream towards one or both end nodes, the trace cell having a link count field set to a non 0 value and a loopback indication set to 1 and carrying the identifications of the monitoring node and a loopback node;

each node downstream on the route forwarding the trace cell downstream if the identification of the loopback node does not match its own identification, and sending to the monitoring node a loopback trace cell having the loopback indication set to 0 and carrying its own identification;

a loopback node downstream on the route sending to the monitoring node a loopback trace cell having the loopback indication set to 0 and carrying its own identification, if the identification of the loopback node matches its own identification.

8. In a telecommunications network having a virtual connection between two end nodes by a route having one or more links, a method of identifying a node forming an end of the route comprising steps of:

sending, from a monitoring node on the route, a trace cell downstream towards one or both end nodes, the trace cell having set a link count field to a non-0 value, a loopback indication to 1 and a loopback location ID to a default value, and the trace cell further carrying the identification of the monitoring node;

forwarding, at each node downstream on the route, the trace cell downstream; and sending, from an end node on the route, to the monitoring node a loopback trace cell having the loopback indication set to 0 and the loopback location ID set to an actual end node ID by overwriting the default value.

* * * * *